United States Patent
Ptasinski et al.

(10) Patent No.: US 8,094,317 B1
(45) Date of Patent: Jan. 10, 2012

(54) PLASMONIC ROUTER

(75) Inventors: Joanna N. Ptasinski, San Diego, CA (US); Stephen Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 117 days.

(21) Appl. No.: 12/793,271

(22) Filed: Jun. 3, 2010

(51) Int. Cl.
*G01N 21/55* (2006.01)

(52) U.S. Cl. ........................................ 356/445; 356/448

(58) Field of Classification Search .......... 356/124–127, 356/445–448; 359/250–254, 260–267, 578–579, 359/298, 584–589, 315–323, 245–247
See application file for complete search history.

(56) References Cited

U.S. PATENT DOCUMENTS

| | | | |
|---|---|---|---|
| 6,384,953 B1 | 5/2002 | Russell et al. | |
| 6,646,782 B1 | 11/2003 | Russell et al. | |
| 6,738,194 B1 | 5/2004 | Ramirez et al. | |
| 6,753,994 B1 | 6/2004 | Russell | |

OTHER PUBLICATIONS

U.S. Appl. No. 12/424,164 by Stephen D. Russell et al., entitled "Plasmonic Transistor", filed Apr. 15, 2009, All.

*Primary Examiner* — Tri T Ton
(74) *Attorney, Agent, or Firm* — Arthur K. Samora; Kyle Eppele

(57) ABSTRACT

A plasmonic router can include a first surface plasmon guide and a second surface plasmon guide. A surface plasmon can be generated in either of the plasmon guides. Each plasmon guide has an energy barrier, which can be selectively decreased to allow selective propagation of the generated surface plasmon through the plasmon guide. The generated surface plasmon has an evanescent wave that extends outwardly from the plasmon guide by a spatial extent. To allow for surface plasmon propagation between plasmon guides, the plasmon guides can be spaced apart by a predetermined gap that is less than the spatial extent of the surface plasmon. When that occurs, the surface plasmon will "jump" the predetermined gap and propagate from one plasmon guide to the other plasmon guide.

14 Claims, 4 Drawing Sheets ment. Additionally,
PLASMONIC ROUTER

FEDERALLY-SPONSORED RESEARCH AND DEVELOPMENT

This invention (Navy Case No. 100224) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

FIELD OF THE INVENTION

The present invention pertains generally to opto-electronic devices. More particularly, the present invention pertains to active opto-electronic devices that manipulate surface plasmon phenomena to affect the direction of propagation of the surface plasmon through the device.

BACKGROUND OF THE INVENTION

Plasmons are quasiparticles resulting from the quantization of plasma oscillations, just as photons and phonons are quantizations of light and sound waves, respectively. Surface plasmons are those plasmons that are confined to surfaces and that interact strongly with light. They occur at the interface of a vacuum or material with a positive dielectric constant with that of a negative dielectric constant (usually a highly conductive material such as a conductive or doped semiconductor).

Plasmonics is a field where one exploits the short wavelength of a surface plasmon in an analogous method as one exploits an optical wavelength for information transfer or data manipulation. But, rather than a quantum of light (a photon), a plasmon, or collective excitation in the electron density, is used.

Plasmons have also been proposed as a means of high-resolution lithography and microscopy due to their extremely small wavelengths. Both of these applications have seen successful demonstrations in the lab environment. Additionally, surface plasmons have the unique capacity to confine light to very small dimensions which could enable many new applications. Plasmons have also been considered as a means of transmitting information on computer chips, since plasmons can support much higher frequencies (into the 100 THz range, while conventional wires become very lossy in the tens of GHz). But for plasmon-based electronics to be useful, a device that allows for control of the propagation of surface plasmons is needed.

In view of the above, it is an object of the present invention to provide a plasmonic router that allows for selective propagation of a surface plasmon through a surface plasmon guide. It is another object of the present invention to provide a plasmonic router that allows for selective propagation of a surface plasmon from one surface plasmon guide to another surface plasmon guide. Still another object of the present invention is to provide a plasmonic router that can be fabricated using existing complementary conductive metal-oxide-semiconductor (CMOS) technology. Another object of the present invention is to device a plasmonic router that is relatively easy to manufacture in a cost-efficient manner.

SUMMARY OF THE INVENTION

A plasmonic routing device in accordance with several embodiments of the present invention can include a first surface plasmon guide having a first energy barrier, and a second surface plasmon guide having a second energy barrier. The device can further include a means for generating a surface plasmon. The surface plasmon is formed with an evanescent wave that extends from the metal/dielectric interface by a spatial extent.

To allow the surface plasmon to propagate from a first guide to a second guide, the guides can be spaced apart by a predetermined gap that is less than the spatial extent of the surface plasmon. The predetermined gap can be manipulated by disposing either the first guide or the second guide (or both) around a cantilever and pivoting the first guide to selectively decrease the gap until it is less that the surface plasmon evanescent wave spatial extent. When that occurs, the surface plasmon will "jump" the predetermined gap between the first and second guide and continue to propagate in the second surface plasmon guide.

Each surface plasmon guide has an energy barrier, with the size of the guide barrier being related to the guide properties. When the guide energy barrier is sufficiently decreased, the surface plasmon evanescent tail extends along the sides of the guide. To manipulate the energy barrier, an electric field can be selectively applied to the dielectric surrounding the surface plasmon guide. The electric field may be produced by a voltage applied to electrodes disposed on the dielectric or by selective illumination of the dielectric. Once the surface plasmon has "jumped" from the first surface plasmon guide to the second surface plasmon guide as described above, the surface plasmon can continue to propagate in the second surface plasmon guide, provided the second energy barrier is low enough for it do so.

For the methods according to several embodiments, first and second surface plasmon guides can be disposed proximate each other by a predetermined gap, as discussed above. A surface plasmon can be generated in one of the guides; the plasmon has an evanescent wave with a spatial extent. The energy barrier of each respective surface plasmon guide can be selectively manipulated to allow for propagation through that guide. To allow for propagation of the surface plasmon from the first guide to the second guide, the predetermined gap can be manipulated until the gap is less than the spatial extent of the plasmon evanescent wave.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

In brief overview, plasmonics is a field where one exploits the short wavelength of a surface plasmon in an analogous method as one exploits an optical wavelength for information transfer or data manipulation. But rather than a quantum of light (a photon), a plasmon (a collective excitation in electron density) is used.

Figure 1:
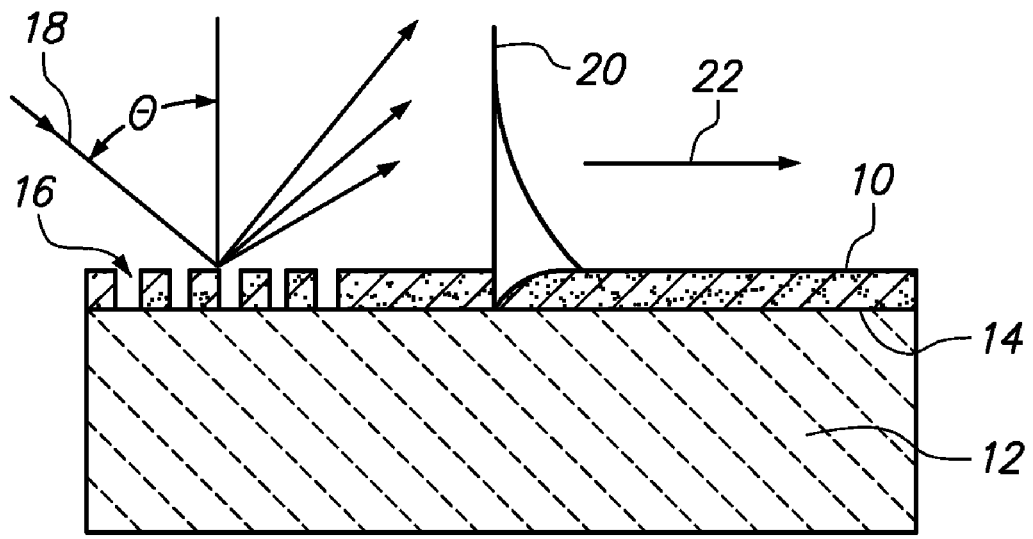
FIG. 1 is a greatly enlarged cross-sectional view of a dielectric substrate and a conductive layer that shows the manner in which a surface plasmon can be generated.
Figure 2:
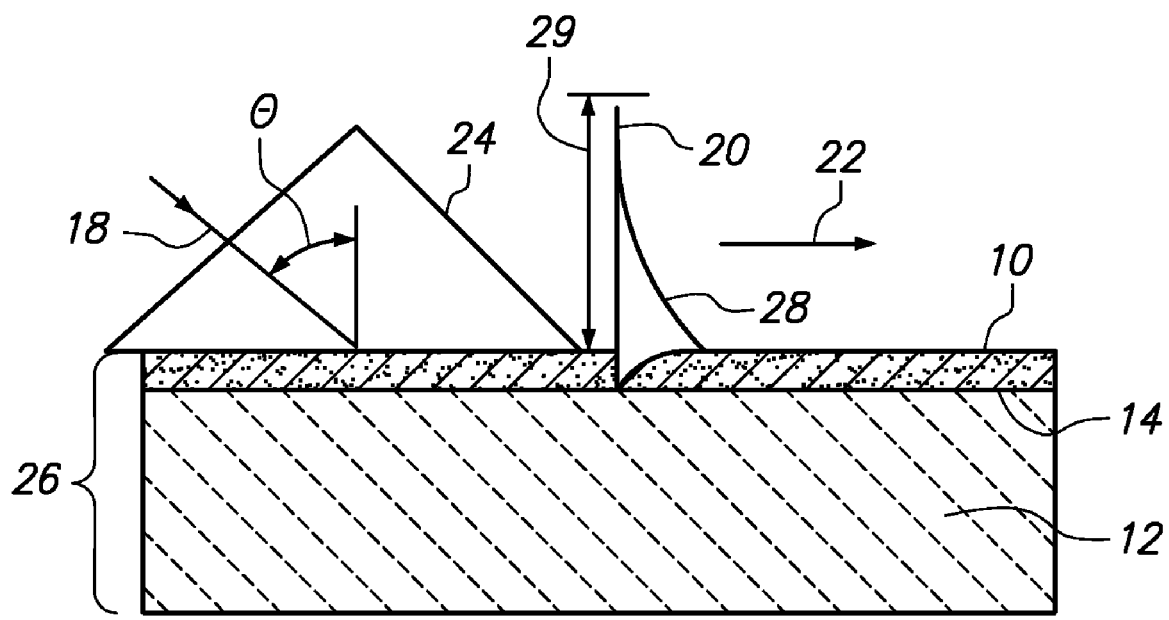
FIG. 2 is the same view as FIG. 1, but with a prism used to establish the surface plasmon instead of a grating.

To establish a surface plasmon, and referring initially to FIGS. 1 and 2, a conductive layer 10 is placed on an electro-optic substrate 12 to establish an interface 14. One may couple light 18 from a light source (not shown) into the thin conductive layer 10 to form a surface plasmon 20 (surface plasmon 20 is not to scale in FIGS. 1 and 2), which travels along interface 14 in the direction of arrow 22 under specific coupling conditions. These coupling conditions are given by Equation [1]:

$$k_{sp} = k\left(\frac{\varepsilon_m \varepsilon_d}{\varepsilon_m + \varepsilon_d}\right)^{1/2} = \frac{\omega}{c}\sqrt{\varepsilon_d \sin\theta} \quad [1]$$

Where $k_{sp}$ is the surface plasmon wave-vector, k is the wave-vector of the incident radiation, $\varepsilon_m$ is the permittivity of the conductive layer (for purposes of this disclosure, permittivity is defined as the ability to transmit, or "permit" an electric field), $\varepsilon_d$ is the permittivity of the electro-optic substrate, ω is the frequency at which coupling conditions occur and surface plasmon will propagate along interface 14, c is the speed of light and θ the angle (from vertical) at which coupling conditions will occur when light 18 impinges on the conductive layer.

There are well known methods of accomplishing this coupling of light 18 into conductive layer 10 to generate surface plasmon 20. For example, a plurality of grooves 16 can be formed in the conductive layer 10 in a manner known in the art, and as shown in FIG. 1. Alternatively, the coupling of light 18 could be accomplished using a high index prism 24 that is placed on conductive layer 10 to establish surface plasmon 20, as shown in FIG. 2. Still other means are known in the art. See for example, U.S. Pat. No. 6,646,782, which issued to Russell et al. for an invention entitled "Solid State Surface Plasmon Light Valve and Tunable Filter", and which is assigned to the same assignee as the present invention, where this is described for a tunable optical filter. See also, U.S. Pat. No. 6,093,941 which issued to Russell et al. for an invention entitled "Photonic Silicon on a Transparent Substrate", and which is assigned to the same assignee as the present invention, for other semiconductor or organic light emitting structures or nanostructures.

As stated above, the surface plasmon can travel in the direction indicated by arrow 22 once it is generated. When this occurs, the layer 10 and substrate 12 together can be thought of as a surface plasmon guide 26, which allows for propagation of surface plasmon 20 along interface 14, much like an electromagnetic wave would propagate in a waveguide. As surface plasmon 20 is generated, an evanescent tail 28 develops, in a direction outward from the direction of travel 22. The evanescent tail 28 extends outwardly from the direction of travel by a distance defined as the spatial extent 29, as indicated in FIG. 2.

This invention describes a device that can direct or re-direct the propagation of the aforementioned surface plasmon once it is generated. To do this, it must be recognized that an energy barrier can be imposed on the surface plasmon guide to selectively allow/prevent propagation of the surface plasmon as well as the surface plasmon evanescent tail extent. Such a barrier may be formed by establishing a composition change in the metallic layer of the surface plasmon device structure, by generating a metallic discontinuity in the surface plasmon device structure, or by modifying the dielectric constant in the surface plasmon device structure. Modifications of the dielectric constant may be made, for example, by applying a voltage across an electro-optic material or illuminating an electro-optic material with light.

Figure 3:
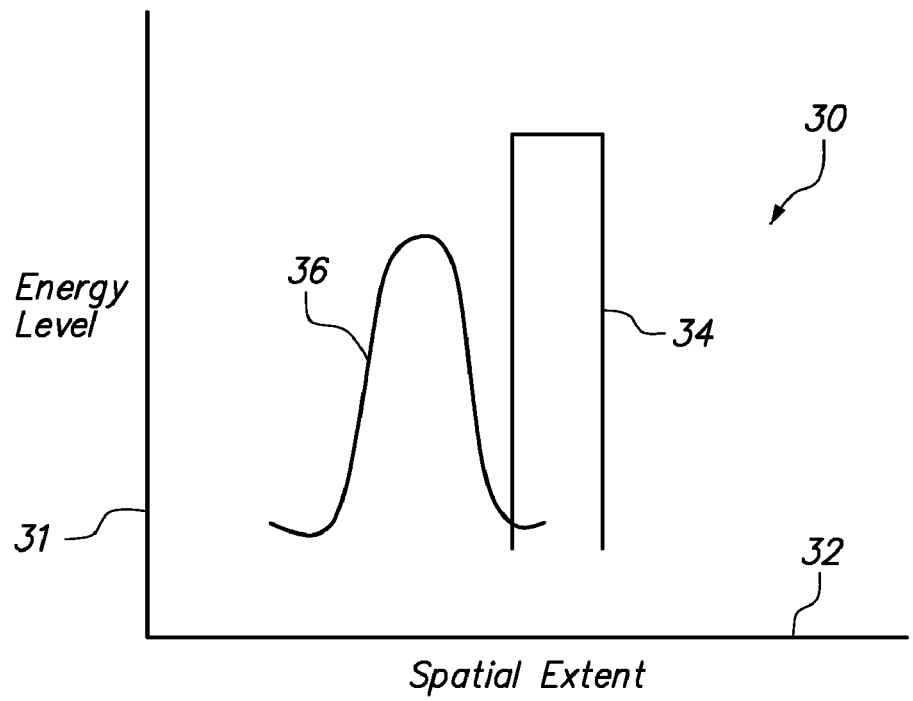
FIG. 3 is a graph that depicts the relationship between surface plasmon wave energy and the surface plasmon guide energy barrier for the plasmonic router of FIG. 1.

Referring now to FIG. 3, FIG. 3 is graph 30 where the y-axis 31 corresponds to the energy level of an energy barrier imposed in the surface plasmon guide and the energy level of the surface plasmon. The x-axis 32 corresponds to the relative spatial extent of the energy barrier and surface plasmon wave-function.

The surface plasmon 20 has a spatial extent characterized by the evanescent wave extending outwardly form the plasmon guide that the surface plasmon propagates, and can be depicted in FIG. 3 as a wave function 36. Energy barrier 34 may be formed to inhibit the propagation of a surface plasmon and can be depicted as curve 34 in FIG. 3. For the surface plasmon wave and energy barrier depicted in FIG. 3, the wave function 36 is blocked by energy barrier 34 since in this example, the area under the energy barrier curve 36 is greater than the area under the evanescent wave energy curve 34.

Figure 4:
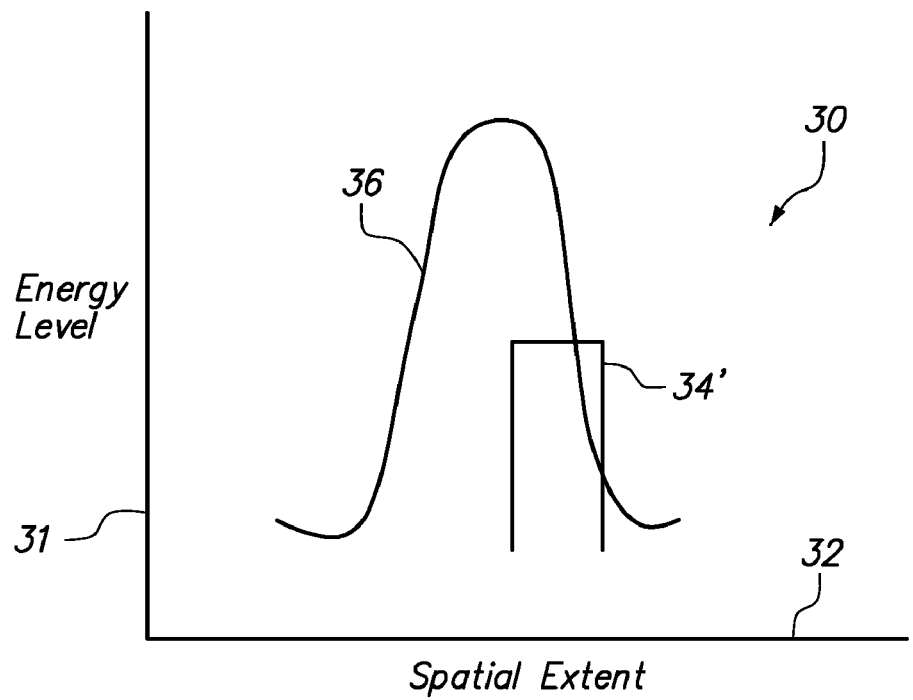
FIG. 4 is the same graph as FIG. 3, but with the energy barrier being less than the wave energy of the surface plasmon.

If one decreases the energy barrier 36 as discussed above by electrical, magnetic, optical or mechanical means, however, then barrier energy curve 34 can change to energy barrier curve 34' as depicted in FIG. 4. In this case, the area under curve 36 is greater than the area under energy barrier curve 34'. Stated differently, the surface plasmon evanescent wave has enough energy to overcome the energy barrier, and the surface plasmon propagates along surface plasmon guide. In this manner, the energy barrier of a surface plasmon guide may be increased or decreased to control the propagation of a surface plasmon within plasmon guide 26.

Note that the energy barrier may be varied by application of an electric field across a dielectric layer, optical illumination to change the dielectric constant of an electro-optic material or mechanical changes of spacing, for example by use of a mechanical cantilever or membrane commonly used by microelectromechanical systems (MEMS) to vary the spatial extent. MEMS devices may be actuated, for example, by applying a voltage or a magnetic field.

Figure 5A:
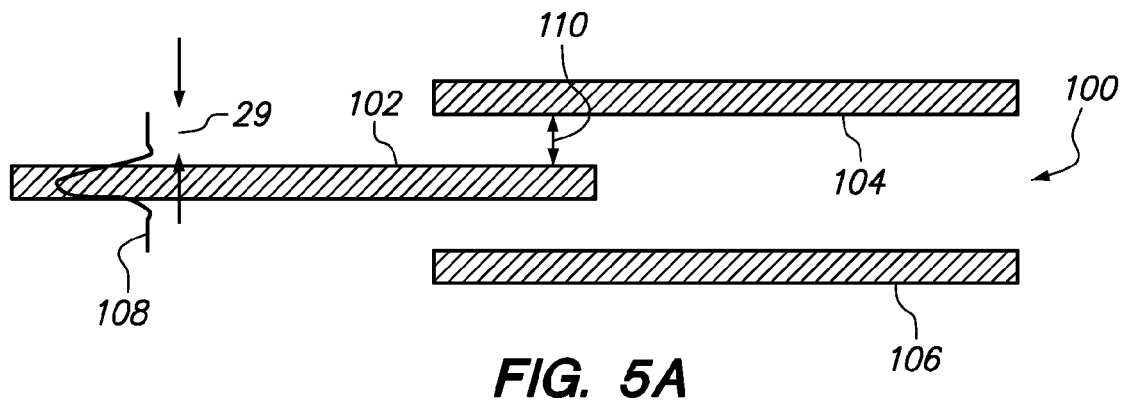
FIG. 5A is a top plan view a plasmonic router according to several embodiments, which shows a plasmon propagating along a surface plasmon guide.
Figure 5B:
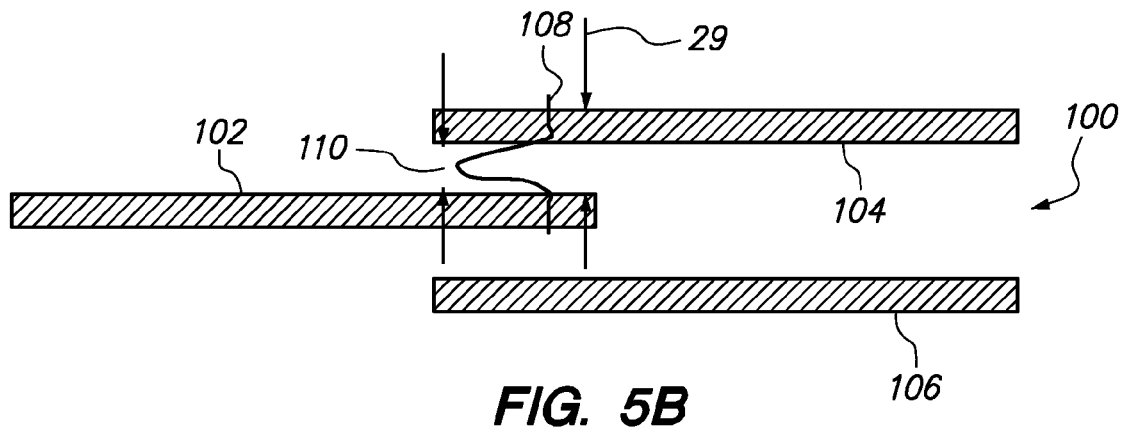
FIG. 5B is the same view as FIG. 5A, which illustrates the surface plasmon propagating from a first surface plasmon guide to a second surface plasmon guide.
Figure 5C:
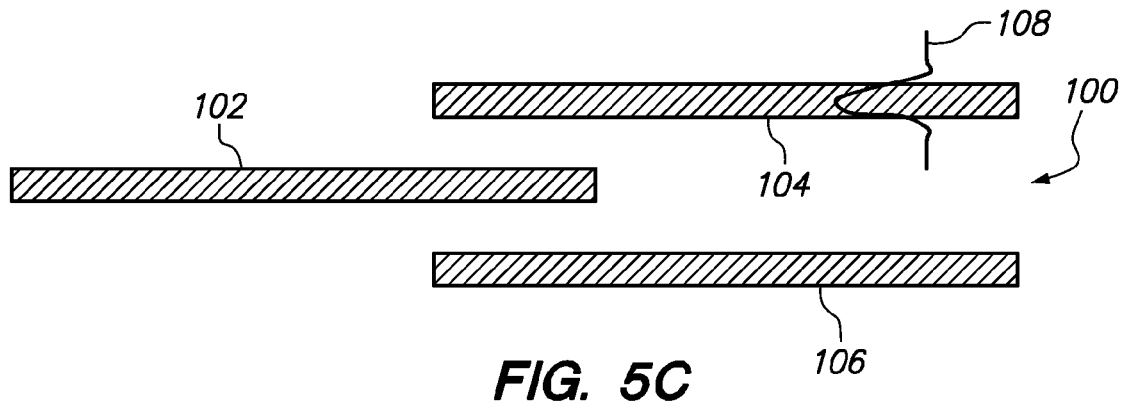
FIG. 5C is the same view as FIG. 5B, but with the surface plasmon having jumped to the second surface plasmon guide and further propagating along the second surface plasmon guide; and, FIG. 6 is a same view as FIGS. 5A-5C, but with the transfer ends of the surface plasmon guides tapered to save space during manufacture of the surface plasmon; and, FIG. 7 is a block diagram which illustrates the steps that can be taken to accomplish the methods according to several embodiments of the present invention.

To route surface plasmons from one surface plasmon guide to another, a surface plasmon routing device 100 may be formed as shown in FIG. 5A through FIG. 5C. FIG. 5A through FIG. 5C schematically show the top plan view of a planar (2-dimensional) surface plasmon routing device 100 that includes first surface plasmon guide 102 and propagating surface plasmon 108. First surface plasmon guide 102 and second and third plasmon guides (104 and 106, respectively) are typically fabricated as a metal trace on a dielectric substrate as disclosed above. FIG. 5A depicts a first surface plasmon guide 102 wherein the energy barrier has been decreased as discussed above to allow propagating surface plasmon 108 to travel through the first surface plasmon guide 102 of the routing device 100.

FIG. 5B illustrates the initial evanescent coupling of the surface plasmon 108 into second surface plasmon guide 104, which is enabled by allowing the evanescent wave of the surface plasmon to spatially extend into the second surface plasmon guide 104. To do this, the predetermined gap 110 between second surface plasmon guide 106 and first surface plasmon guide 104 must be less than the spatial extent 29 of the surface plasmon evanescent tail 28.

FIG. 5C shows a configuration wherein surface plasmon 108 has "jumped" to second surface plasmon guide 104, and where subsequent propagation of the surface plasmon 108 in second surface plasmon guide 104 has occurred. The surface plasmon may then be redirected as desired by increased or decreasing the second energy barrier for the second surface guide 104. Although not depicted in a FIG. 5C, the alternate directing may take place to couple the evanescent wave of the surface plasmon 108 into the third surface plasmon guide 106 by reducing the energy barrier enough to allow the evanescent wave of the surface plasmon 108 to propagate and spatially extend into the third surface plasmon guide 106.

Figure 6:
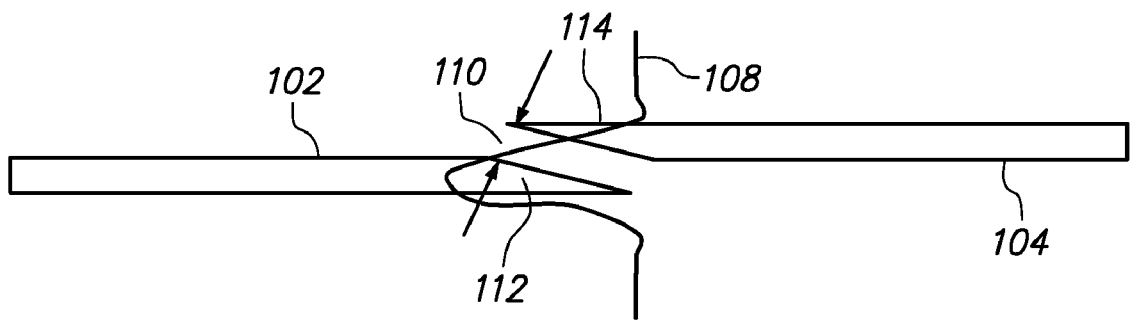

As noted previously, FIGS. 5A to 5C are schematic examples of a surface plasmon routing device. Obviously the geometric structure may be rearranged as desired as long as the evanescent wave coupling in managed as desired by control of the energy barrier and by manipulating predetermined gap 110. For example, it may be desirable to closely space the metallic traces of the surface plasmon routing device to minimize the area used by the device. FIG. 6 shows an exemplary structure with first surface plasmon guide 102 and second surface plasmon guide 104 having respective tapered transfer ends 112, 114, which allows for closer spacing between the metallic layers 10 for two surface plasmon guides, yet still enables evanescent coupling of the surface plasmon evanescent wave 108 between first surface plasmon guide 102 and second surface plasmon guide 104, provided the respective energy barriers allow it to do so.

Note that in the above embodiments, FIGS. 5A-5C and 6 depict a top view of the surface plasmon routing device for planar devices. However, for 3-dimensional routing, one can use similar diagrams for routing both above and below the plane of the first surface plasmon guide. As before, one forms a suitably patterned metal layer on a suitable dielectric or electro-optic substrate which is capable of supporting surface plasmons. The plasmonic routing device has an input region where the surface plasmon propagates at the interface of the metal-dielectric material, and an output region for outgoing surface plasmon propagation.

One can use Al, Au, Rh, metallic alloys and other highly conductive materials for conductive layers 10 that support the surface plasmon generation and propagation within plasmon guide 26. There are typically advantages for using metals that will produce a narrow plasmon resonance such as Ag, since one can switch between the digital one and zero state easily. But Rh—Al, which has a broadband resonance, may be desirable in many designs. Also, there may be confinement structures using photonic bandgap technology incorporated, as desired, to improve isolation between plasmonic devices to avoid "cross-talk" or unintended switching of adjacent devices.

Figure 7:
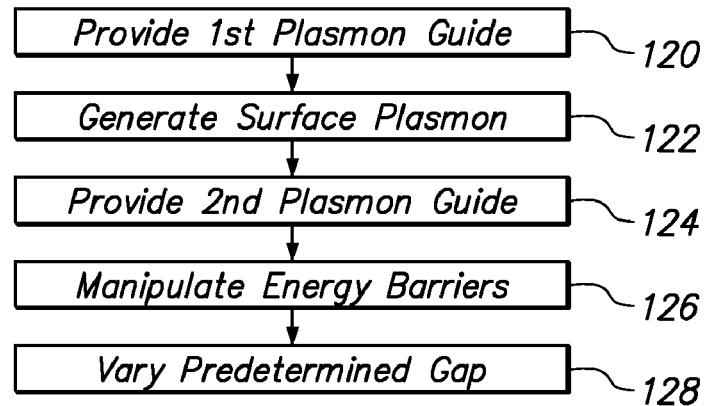

For the methods according to several embodiments of the present invention, and referring now primarily to FIG. 7, an initial step of providing a first surface plasmon guide is included, as indicated by block 120 in FIG. 7. A surface plasmon can be generated in first surface plasmon guide, as indicated by block 122, and a second surface plasmon guide can be provided as shown by block 124. To allow the surface plasmon to propagate through first surface plasmon guide, the first energy barrier can be selectively decreased, as shown by block 126. To allow propagation across surface plasmon guide, the guides can be selectively spaced apart so that the predetermined gap 110 described above is less then the spatial extent of the evanescent tail spatial extent of the surface plasmon, as shown by block 128.

The selective spacing can be accomplished by disposing either the first surface plasmon guide or the second surface plasmon guide around a cantilever and selectively pivoting the surface plasmon guide which has been so disposed. Once the evanescent coupling has occurred and surface plasmon has "jumped" from first surface plasmon guide to second plasmon guide, the second energy barrier corresponding to the second plasmon guide can be manipulated to allow the surface plasmon to further propagate in the second surface plasmon guide, as desired by the user. The energy barrier can be manipulated by imposing a variable voltage on the dielectric substrate or selectively illuminating the substrate as discussed above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A surface plasmon routing device comprising:
   at least two surface plasmon guides spaced-part by a predetermined gap;
   means for generating a surface plasmon in one of said surface plasmon guides, said surface plasmon having an evanescent tail defining a spatial extent; and, said predetermined gap being less than said spatial extent to allow said surface plasmon to propagate across said predetermined gap to the other of said surface plasmon guides.

2. The device of claim 1 wherein said surface plasmon guides each have a respective energy barrier, and further comprising:
   a means for varying said energy barriers to allow selective propagation of said surface plasmon through said first plasmon guide.

3. The device of claim 2 wherein said first plasmon guide has a dielectric material and said varying means is a voltage applied to said dielectric material.

4. The device of claim 2 wherein said first surface plasmon includes a dielectric material and said varying means is a means for illuminating said dielectric material.

5. The device of claim 1 further comprising a cantilever, said second surface plasmon guide being pivotably disposed on said cantilever for manipulating said predetermined gap.

6. A method for routing a surface plasmon comprising the steps of:
   A) providing a first surface plasmon guide having a first energy barrier;
   B) generating a surface plasmon in said first surface plasmon guide, said surface plasmon having an evanescent wave defining a spatial extent;
   C) affording a second surface plasmon guide having a second energy barrier; and,
   D) selectively spacing said second surface plasmon guide proximate said first surface plasmon guide by a predetermined gap to allow selective propagation of said surface plasmon across said gap to said second plasmon.

7. The method of claim 6 further comprising the step of:
   E) selectively manipulating said first energy barrier to allow said surface plasmon to propagate through said first guide and across said spatial extent to said second guide.

8. The method of claim 7 wherein said first surface plasmon guide includes a dielectric material, and further wherein said step E) is accomplished by selectively applying a voltage to said dielectric material.

9. The method of claim 7 wherein said first surface plasmon guide includes a dielectric material and wherein said step E) is accomplished by selectively illuminating said dielectric material.

10. The method of claim 6 wherein said step D) further comprises the steps of:
    F) pivotably disposing said first plasmon guide around a cantilever; and,
    G) selectively pivoting said first plasmon guide so that said predetermined gap is intermittently less than said spatial extent.

11. The method of claim 6 further comprising the step of:
    H) selectively manipulating said second energy barrier to allow said surface plasmon to propagate through said second surface plasmon guide, said step H) being accomplished after said step D).

12. The method of claim 11 wherein said second surface plasmon guide includes a dielectric material, and further wherein said step H) is accomplished by selectively applying a voltage to said dielectric material.

13. The method of claim 11 wherein said second surface plasmon guide includes a dielectric material and wherein said step H) is accomplished by selectively illuminating said dielectric material.

14. The method of claim 6 wherein said step D) further comprises the steps of:
    I) pivotably disposing said second surface plasmon guide around a cantilever; and,
    J) selectively pivoting said second surface plasmon guide so that said predetermined gap is intermittently less than said spatial extent.

* * * * *